United States Patent
Sumita

(10) Patent No.: US 11,418,954 B2
(45) Date of Patent: Aug. 16, 2022

(54) INFORMATION PROCESSING METHOD, INFORMATION PROCESSING SYSTEM, AND COMMUNICATION APPARATUS

(71) Applicant: CANON KABUSHIKI KAISHA, Tokyo (JP)

(72) Inventor: Chisei Sumita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 16/520,981

(22) Filed: Jul. 24, 2019

(65) Prior Publication Data

US 2020/0045545 A1    Feb. 6, 2020

(30) Foreign Application Priority Data

Jul. 31, 2018    (JP) .............................. JP2018-143281

(51) Int. Cl.
| | | |
|---|---|---|
| *H04L 29/06* | (2006.01) | |
| *H04W 12/06* | (2021.01) | |
| *H04L 9/08* | (2006.01) | |
| *H04W 12/041* | (2021.01) | |
| *H04W 4/80* | (2018.01) | |
| *H04N 1/44* | (2006.01) | |

(52) U.S. Cl.
CPC .......... *H04W 12/06* (2013.01); *H04L 9/0891* (2013.01); *H04L 9/0894* (2013.01); *H04W 12/041* (2021.01); *H04L 2209/80* (2013.01); *H04N 1/4426* (2013.01); *H04W 4/80* (2018.02)

(58) Field of Classification Search
CPC ...... H04W 12/06; H04W 4/80; H04L 9/0891; H04L 9/0894; H04L 2209/80
See application file for complete search history.

(56) References Cited

U.S. PATENT DOCUMENTS

| | | | |
|---|---|---|---|
| 9,215,075 B1 | 12/2015 | Poltorak | |
| 9,894,067 B1* | 2/2018 | Mandadi | H04L 63/0807 |
| 10,277,569 B1* | 4/2019 | Barbour | H04L 67/142 |
| 10,447,870 B2 | 10/2019 | Naito | |
| 10,582,505 B2 | 3/2020 | Lee et al. | |
| 2003/0182566 A1* | 9/2003 | Kohara | H04L 9/0894 713/193 |
| 2005/0163549 A1 | 7/2005 | Shima | |
| 2009/0327724 A1 | 12/2009 | Shah | |
| 2014/0258724 A1 | 9/2014 | Lambert | |
| 2015/0254477 A1 | 9/2015 | Matsumoto | |

(Continued)

FOREIGN PATENT DOCUMENTS

| | | |
|---|---|---|
| JP | 2015-39079 A | 2/2015 |
| JP | 2017-537507 A | 12/2017 |

(Continued)

*Primary Examiner* — Shawnchoy Rahman
(74) *Attorney, Agent, or Firm* — Canon U.S.A., Inc., IP Division

(57) ABSTRACT

Key information to be used for generating a decryption key is written into a storage area that can be referred to by an information processing apparatus via a predetermined wireless communication. If the elapsed time from when the key information is written into the storage area exceeds a predetermined time, control regarding the key information stored in the storage area is performed so as not to perform a registration process. In this case, the predetermined time differs according to an event when the key information is written.

20 Claims, 10 Drawing Sheets

(56) References Cited

U.S. PATENT DOCUMENTS

| | | | |
|---|---|---|---|
| 2016/0112346 A1* | 4/2016 | Nahrgang | G06F 9/5077 |
| | | | 709/226 |
| 2017/0102903 A1 | 4/2017 | Nagasawa | |
| 2017/0286028 A1 | 10/2017 | Yang | |
| 2019/0180546 A1* | 6/2019 | Tsujimura | G06Q 10/08 |
| 2020/0009461 A1* | 1/2020 | Lee | A63F 13/58 |

FOREIGN PATENT DOCUMENTS

| | | |
|---|---|---|
| JP | 2018-030295 A | 3/2018 |
| WO | 2016/054251 A1 | 4/2016 |
| WO | 2017/168228 A1 | 10/2017 |

\* cited by examiner

FIG. 6

| Service UUID | Service Name | Characteristic UUID | Content | Read | Write | Encryption | Value | |
|---|---|---|---|---|---|---|---|---|
| 00000000-0000-1000-1000-00405f9b34fb | Original | 00000000-0000-2000-1000-00405f9b34fb | ... | | | | | |
| | | | SSID | YES | — | YES | (PrinterSSID) | ~601 |
| | | 00000000-0000-2000-1000-00405f9b34fc | PASSWORD | YES | — | YES | (aaaabbbb) | ~602 |
| | | 00000000-0000-2000-1000-00405f9b34fd | KEY SEED | YES | — | — | abcdefgh or 00000000 | ~603 |
| | | 00000000-0000-2000-1000-00405f9b34fe | PROPER NOUN | YES | — | YES | (printer) | ~604 |
| | | 00000000-0000-2000-1000-00405f9b34ff | COMPLETION NOTIFICATION | — | YES | YES | (registered) | ~605 |

FIG. 11

| EVENT | TIMEOUT TIME |
|---|---|
| USER OPERATION | 10 SECONDS |
| INITIAL SETTING | 1 HOUR |

INFORMATION PROCESSING METHOD, INFORMATION PROCESSING SYSTEM, AND COMMUNICATION APPARATUS

BACKGROUND OF THE INVENTION

Field of the Invention

The present invention relates to an information processing method for performing communication via a predetermined wireless communication, an information processing system, and a communication apparatus.

Description of the Related Art

In recent years, wireless communication between apparatuses has widely been used. There is also a technique for authenticating the devices and registering a communication partner before transferring various kinds of data via a wireless communication. Japanese Patent Laid-Open No. 2015-39079 discloses a method in which an apparatus transmits a public key and another apparatus transmits, as a reply, data that is encrypted by using the public key so as to perform authentication.

If authentication for wireless communication is always allowed, at a timing not intended by a user, another unintended user may perform authentication. That is, the security level may be decreased. Thus, it is considered to provide a time limit for the state where authentication is allowed.

However, if the time limit is short, for example, a user operation for allowing authentication via a wireless communication may become invalid with a high possibility, which may impair the user's convenience. On the other hand, if the time limit is long, the security level may be decreased.

SUMMARY OF THE INVENTION

Accordingly, the present invention provides an information processing method by which both the user's convenience and the security level can be secured in a process for registering a communication partner apparatus. The present invention also provides an information processing system and a communication apparatus.

The present invention provides an information processing method in an information processing system including a communication apparatus and an information processing apparatus, the communication apparatus including a first communication unit that performs communication via a predetermined wireless communication, the information processing apparatus including a second communication unit that performs communication via the predetermined wireless communication. The information processing method includes: writing, by the communication apparatus, key information to be used for generating a decryption key, into a storage area that the information processing apparatus is capable of referring to by using the second communication unit; reading, by the information processing apparatus using the second communication unit, the key information that has been written into the storage area; performing, by the information processing apparatus, a registration process for registering the communication apparatus if the decryption key is generated and if first information which is read from the communication apparatus and is decrypted on the basis of the generated decryption key corresponding with second information which is stored in advance in the information processing apparatus; and performing, by the communication apparatus, control regarding the key information stored in the storage area such that the key information becomes invalid if an elapsed time from when the key information is written into the storage area in the writing exceeds a predetermined time. The communication apparatus is configured to write the key information into the storage area if a first event or a second event occurs, and the predetermined time differs between a case where the key information is written in response to occurrence of the first event and a case where the key information is written in response to occurrence of the second event.

Further features of the present invention will become apparent from the following description of embodiments with reference to the attached drawings.

BRIEF DESCRIPTION OF THE DRAWINGS

FIG. 6 illustrates the structure of a database included in the short-range wireless communication unit of the communication apparatus.

FIG. 11 illustrates a timeout time for maintaining the key seed public state.

DESCRIPTION OF THE EMBODIMENTS

Now, an embodiment of the present invention will be specifically described below with reference to the drawings. However, the relative arrangement of components, display screens, and the like described in the embodiment shall not limit the scope of the invention to those unless otherwise specified.

This embodiment will describe, as an example of predetermined wireless communication, low-power-consumption wireless communication called Bluetooth Low Energy (hereinafter BLE) settled in Bluetooth core specification V4.2. According to the BLE standard, a communication apparatus broadcasts an advertising packet with intervals to let it be known that the communication apparatus exists. Other communication apparatuses receive the broadcast advertising packet, and at a timing after receipt, a process for Generic Attribute Profile (hereinafter GATT) communication is performed for communication between devices. Details will be described later.

Next, an information processing apparatus and a communication apparatus included in an information processing system according to this embodiment will be described. Although this embodiment describes a smartphone as an example of the information processing apparatus, the information processing apparatus is not limited to this. Various apparatuses such as a mobile terminal, a laptop computer, a tablet terminal, a personal digital assistant (PDA), and a digital camera are also applicable. In addition, although this embodiment describes a printer as an example of the communication apparatus, the communication apparatus is not limited to this either. Various apparatuses are applicable as long as the apparatus can perform wireless communication with the information processing apparatus. For example, as the printer, an inkjet printer, a full-color laser beam printer, a monochrome printer, and the like are applicable. Furthermore, not only the printer but also other apparatuses are also applicable, such as a copying machine, a facsimile, a mobile terminal, a smartphone, a laptop computer, a tablet terminal, a PDA, a digital camera, a music reproduction device, and a television. Besides, a multi-function peripheral (MFP) including a plurality of functions such as a copy function, a fax function, and a print function is also applicable.

Figure 1:
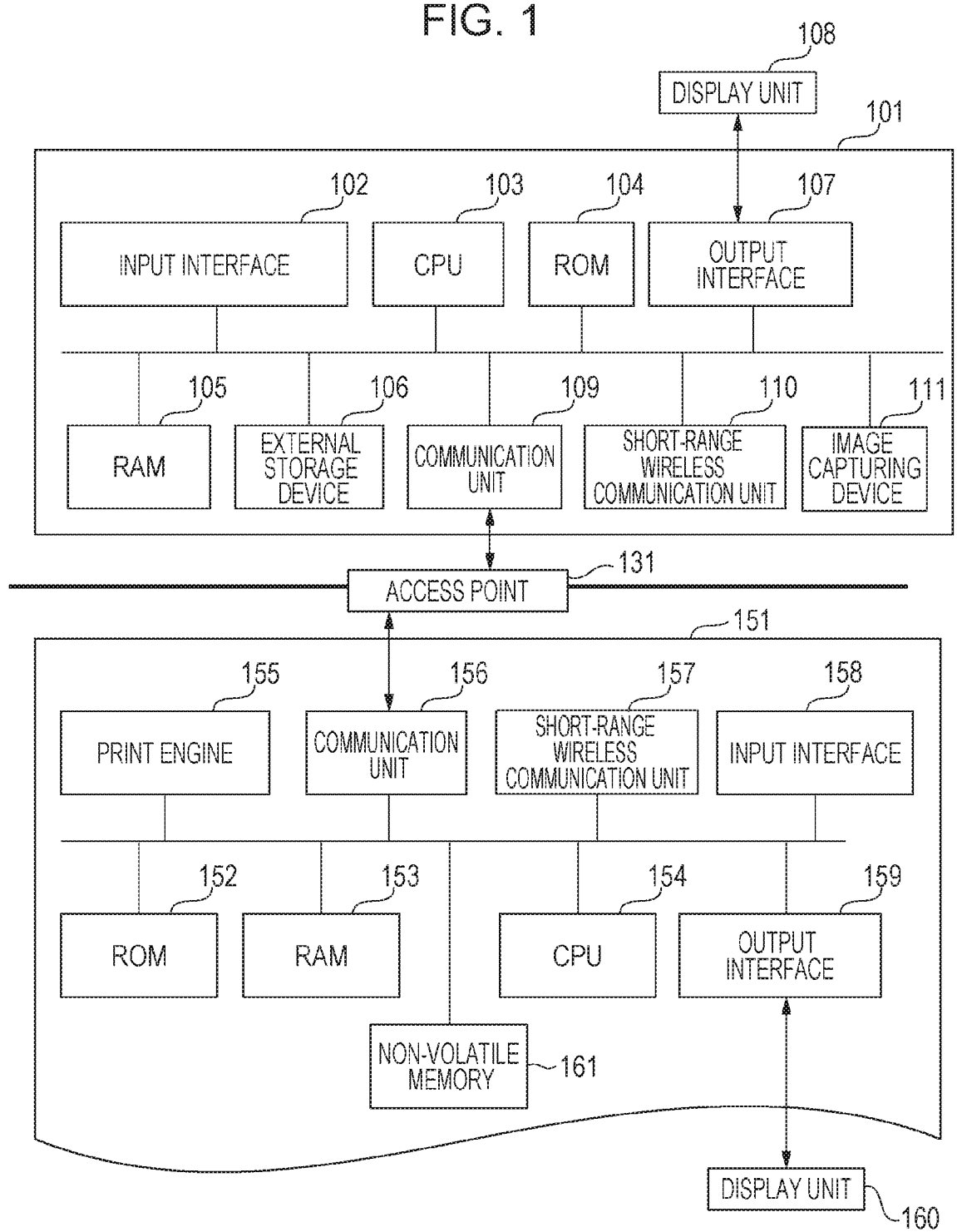
FIG. 1 illustrates the configuration of an information processing apparatus according to an embodiment and the configuration of a communication apparatus according to the embodiment.

First, the configuration of the information processing apparatus according to this embodiment and the configuration of the communication apparatus that can communicate with the information processing apparatus according to this embodiment will be described. FIG. 1 illustrates the configuration of the information processing apparatus according to this embodiment and the configuration of the communication apparatus according to this embodiment. Although this embodiment will describe the information processing apparatus having the following configuration as an example, this embodiment is applicable to any apparatus that can communicate with the communication apparatus, and the functions thereof are not limited to those illustrated in FIG. 1.

An information processing apparatus 101 is the information processing apparatus according to this embodiment. The information processing apparatus 101 includes an input interface 102, a central processing unit (CPU) 103, a read-only memory (ROM) 104, and a random access memory (RAM) 105. The information processing apparatus 101 further includes an external storage device 106, an output interface 107, a display unit 108, a communication unit 109, a short-range wireless communication unit 110, an image capturing device 111, and the like. The information processing apparatus 101 is assumed to be, but is not limited to, a device such as a smartphone, and may be any apparatus such as a personal computer (PC).

The input interface 102 is an interface for receiving data input or operation instructions from a user, and is formed of a physical keyboard, buttons, a touch panel, or the like. Note that the output interface 107 that will be described later and the input interface 102 may be the same configuration so that the same configuration can output a screen and receive a user operation.

The CPU 103 is a system control unit and controls the entirety of the information processing apparatus 101.

The ROM 104 stores fixed data such as control programs to be executed by the CPU 103, a data table, and an embedded operating system (hereinafter OS) program. In this embodiment, the control programs stored in the ROM 104 control execution of software such as scheduling, task switching, and interrupt processing, under the control of the embedded OS stored in the ROM 104.

The RAM 105 is formed of, for example, a static random access memory (SRAM) that needs a backup power supply. Since the RAM 105 holds data with a primary battery for data backup (not illustrated), important data such as a program control variable can be stored without volatilization. In addition, the RAM 105 also includes a memory area for storing setting information of the information processing apparatus 101, management information of the information processing apparatus 101, and the like. Furthermore, the RAM 105 is also used as a main memory and a work memory of the CPU 103.

The external storage device 106 includes an application for providing a print function. In addition, the external storage device 106 includes various programs such as a print information generating program for generating print information that can be interpreted by a communication apparatus 151, an information transmission/reception control program for transmitting/receiving information to/from the communication apparatus 151 that is connected via the communication unit 109, and the like. The external storage device 106 stores various kinds of information to be used for these programs. The external storage device 106 also stores image data obtained from another information processing apparatus or via the Internet through the communication unit 109.

The output interface 107 is an interface that controls the display unit 108 to display data or to notify the user of the state of the information processing apparatus 101.

The display unit 108 is formed of a light emitting diode (LED), a liquid crystal display (LCD), or the like and displays data or notifies the user of the state of the information processing apparatus 101. Note that a soft keyboard including keys such as numeral input keys, mode setting keys, a determination key, a cancel key, and a power key may be provided on the display unit 108 so as to receive inputs from the user through the display unit 108.

The communication unit 109 is a component for establishing a connection with an apparatus such as the communication apparatus 151 to perform data communication. For example, the communication unit 109 can be connected to an access point (not illustrated) within the communication apparatus 151. The connection between the communication unit 109 and the access point within the communication apparatus 151 enables mutual communication between the information processing apparatus 101 and the communication apparatus 151. Note that the communication unit 109 may also directly communicate with the communication apparatus 151 via a wireless communication, or may communicate with the communication apparatus 151 via an external access point (an access point 131) that is present outside the information processing apparatus 101 and the communication apparatus 151. Examples of the wireless communication scheme include Wi-Fi (Wireless Fidelity) (registered trademark), Bluetooth (registered trademark), and the like. In addition, examples of the access point 131 include a device such as a wireless local area network (LAN) router. Note that the scheme in which the information processing apparatus 101 and the communication apparatus 151 are directly connected bypassing an external access point will be referred to as a direct connection scheme whereas the scheme in which the information processing apparatus 101 and the communication apparatus 151 are connected via the external access point will be referred to as an infrastructure connection scheme in this embodiment.

The short-range wireless communication unit 110 is a component that establishes a short-range wireless connection with an apparatus such as the communication apparatus 151 to perform data communication and performs communication by a communication scheme that is different from that of the communication unit 109. The short-range wireless communication unit 110 can be connected to a short-range wireless communication unit 157 within the communication apparatus 151. Note that Bluetooth Low Energy (BLE) is used as the communication scheme of the short-range wireless communication unit 110 in this embodiment. Bluetooth Device Address (BD_ADDR) that is identification information unique to each Bluetooth device is assigned to a communication module of the device.

The image capturing device 111 is a device that converts an image captured by an image sensor into digital data. The digital data is stored in the RAM 105. Subsequently, the data is converted into image data in a predetermined image format by using a program executed by a CPU 154 and is stored in the external storage device 106 as the image data.

The communication apparatus 151 is the communication apparatus according to this embodiment. The communication apparatus 151 includes a ROM 152, a RAM 153, the CPU 154, a print engine 155, a communication unit 156, the short-range wireless communication unit 157, an input interface 158, an output interface 159, a display unit 160, a non-volatile memory 161, and the like. The communication apparatus 151 is assumed to be, but is not limited to, a device such as an MFP.

The communication unit 156 includes an access point for connecting to an apparatus such as the information processing apparatus 101 as an access point within the communication apparatus 151. Note that the access point can be connected to the communication unit 109 of the information processing apparatus 101. Note also that the communication unit 156 may directly communicate with the information processing apparatus 101 via a wireless communication, or may communicate with the information processing apparatus 101 via the access point 131. Examples of the communication scheme include Wi-Fi (registered trademark), Bluetooth, and the like. In addition, the communication unit 156 may include a hardware component that serves as an access point or may operate as an access point by using software for causing the communication unit 156 to serve as the access point.

The RAM 153 is formed of, for example, a dynamic random access memory (DRAM) that needs a backup power supply. Since the RAM 153 holds data by being supplied with the power supply for data backup (not illustrated), important data such as a program control variable can be stored without volatilization. In addition, the RAM 153 is also used as a main memory and a work memory of the CPU 154, and stores various kinds of information and a reception buffer for storing print information received from the information processing apparatus 101 or the like.

The ROM 152 stores fixed data such as control programs to be executed by the CPU 154, a data table, and an OS program. In this embodiment, the control programs stored in the ROM 152 control execution of software such as scheduling, task switching, and interrupt processing, under the control of the embedded OS stored in the ROM 152. In addition, the ROM 152 also includes a memory area for storing data that needs to be held even when the power supply is not supplied, such as setting information of the communication apparatus 151, management data of the communication apparatus 151, and the like.

The CPU 154 is a system control unit and controls the entirety of the communication apparatus 151.

The print engine 155 forms an image on a recording medium such as paper by using a recording material such as ink on the basis of information stored in the RAM 153 or a print job received from the information processing apparatus 101 or the like and outputs a print result. At this time, the print job transmitted from the information processing apparatus 101 or the like has a large transmission data amount, and high-speed communication is required. Thus, the print job is received through the communication unit 156 that can perform communication at a higher speed than the short-range wireless communication unit 157.

The input interface 158 is an interface for receiving data input or operation instructions from a user, and is formed of a physical keyboard, buttons, a touch panel, or the like. Note that the output interface 159 that will be described later and the input interface 158 may be the same configuration so that the same configuration can output a screen and receive a user operation. The output interface 159 is an interface that controls the display unit 160 to display data or to notify a user of the state of the communication apparatus 151.

The display unit 160 is formed of an LED, an LCD, or the like and displays data or notifies the user of the state of the communication apparatus 151. Note that a soft keyboard including keys such as numeral input keys, mode setting keys, a determination key, a cancel key, and a power key may be provided on the display unit 160 so as to receive inputs from the user through the display unit 160.

The non-volatile memory 161 is formed of a device such as an electrically erasable programmable read-only memory (EEPROM) or a flash memory. The non-volatile memory 161 is mainly used for storing data of a setting value or the like of the communication apparatus 151, which needs to be held even when the power supply of the communication apparatus 151 is not supplied.

Figure 2:
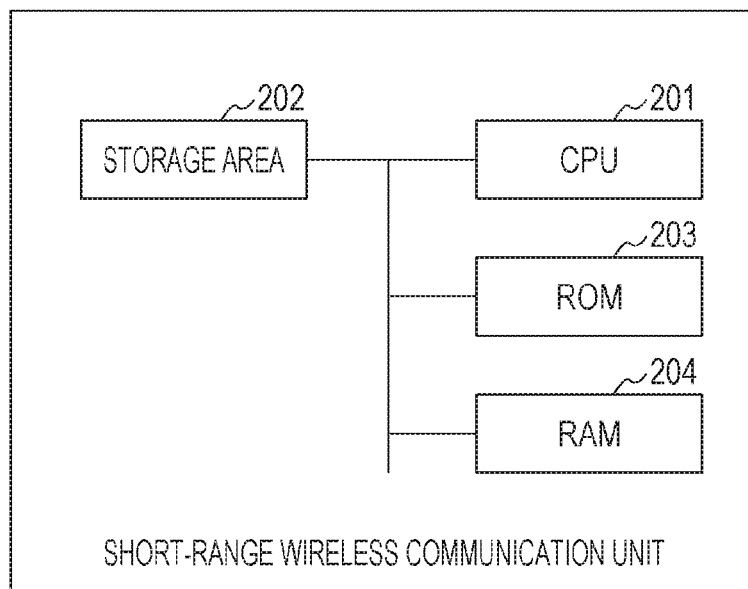
FIG. 2 illustrates the configuration of a short-range wireless communication unit in the embodiment.

FIG. 2 illustrates details of the short-range wireless communication unit 157. The short-range wireless communication unit 157 is a component for establishing a short-range wireless connection with an apparatus such as the information processing apparatus 101. In this embodiment, BLE is used as the communication scheme of the short-range wireless communication unit 157. The short-range wireless communication unit 157 communicates with the CPU 154 via a bus interface such as Inter-Integrated Circuit ($I^2C$). The short-range wireless communication unit 157 includes a CPU 201, a storage area 202, a ROM 203, and a RAM 204. The storage area 202 is accessible from the CPU 154. The storage area 202 is also accessible from the information processing apparatus 101 through the short-range wireless communication unit 110. The RAM 204 is formed of, for example, a DRAM that needs a backup power supply. Since the RAM 204 holds data by being supplied with the power supply for data backup (not illustrated), important data such as a program control variable can be stored without volatilization. In addition, the RAM 204 is also used as a main memory and a work memory of the CPU 201. The ROM 203 stores fixed data such as control programs to be executed by the CPU 201, a data table, and an OS program.

Note that a memory such as an external hard disk drive (HDD) or a secure digital (SD) card may be attached to the communication apparatus 151 as an optional device, and information stored in the communication apparatus 151 may be stored in the memory.

Although this embodiment has illustrated processing allocated to the information processing apparatus 101 and the communication apparatus 151 as described above, the processing allocation is not limited to this example. The processing may be allocated in a different manner.

Now, an outline of the Generic Attribute Profile (GATT) communication in accordance with the BLE standard will be described.

In the GATT, two roles, a GATT client and a GATT server, are defined for a device that transfers data and a device that receives data. The GATT client transmits a request to the GATT server and receives a response from the GATT server.

In this embodiment, the information processing apparatus 101 serves as the GATT client. Upon receipt of the request from the GATT client, the GATT server transmits a response. In this embodiment, the communication apparatus 151 serves as the GATT server. In addition, the GATT server is a device that stores data or status information. On the other hand, the GATT client can read/write data from/to the GATT server.

Figure 3:
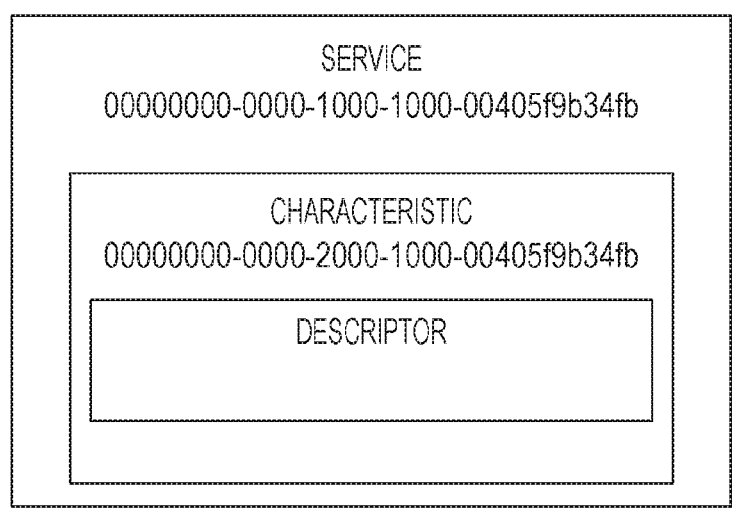
FIG. 3 illustrates a Generic Attribute Profile (GATT) data format described in the embodiment.

Next, a GATT data format will be described. The GATT data is formed of three elements called service, characteristic, and descriptor. The relationship among these three elements is illustrated in FIG. 3. Note that the descriptor is optional and may be absent.

Each of the service, characteristic, and descriptor can be identified by means of a 32-digit universally unique identifier (UUID). However, the service, characteristic, and descriptor that are defined by the standard of Bluetooth SIG are represented in 4 digits.

The UUID herein is used as an identifier for uniquely identifying an object on software. The UUID is a 128-bit numerical value and is normally represented by a hexadecimal number, such as "550e8400-e29b-41 d4-a716-446655440000".

Each characteristic has its unique value. The descriptor has an attribute value to be used when additional information is necessary for the characteristic. For each of the service, characteristic, and descriptor, it is possible to set a read/write attribute or a security attribute with respect to the GATT client.

The GATT client can read/write the value of each characteristic by designating the service UUID and the characteristic UUID. However, whether read/write is allowed depends on the read/write attribute that is set for each service and for each characteristic.

Now, processes according to this embodiment will be described with reference to FIGS. 4, 5, 6, 7, 8, 9, 10, and 11. The following process performed by the communication apparatus 151 is realized by the CPU 154 executing a program stored in a storage area of the ROM 152 or the like in the RAM 153. On the other hand, the process performed by the information processing apparatus 101 is realized by the CPU 103 executing a program (e.g., application program) stored in a storage area of the ROM 104 or the like in the RAM 105.

A process in which the communication apparatus 151 generates a key seed or reads an existing key seed will be described with reference to the flowchart in FIG. 4.

The key seed herein is key information about an encryption key and is a value used for generating the encryption key. In addition, the encryption key is a value to be used when encryption is performed. In this embodiment, the encryption key is calculated by using the key seed. The algorithm for calculating the encryption key from the key seed is a hash function in this embodiment. The hash function is a function that is designed to have a unique output from an input, to have as few outputs having the same value as possible. However, the algorithm for calculating the encryption key is not limited to the hash function, and any algorithm by which an input and an output are uniquely determined may be used.

In addition, in this embodiment, the key seed is generated by performing control such that the key seed and an invalid value are distinguishable from each other. Specifically, the key seed having a value of 0 is treated as the invalid value, and generation of the key seed is controlled so as not to generate the invalid value.

In S401, the communication apparatus 151 determines whether the key seed is stored in the non-volatile memory 161 within the communication apparatus 151. In S401, the CPU 154 performs processing for reading information from an area for the key seed provided in the non-volatile memory 161 and determines whether the information is the invalid value so as to determine whether the key seed is stored.

Figure 4:
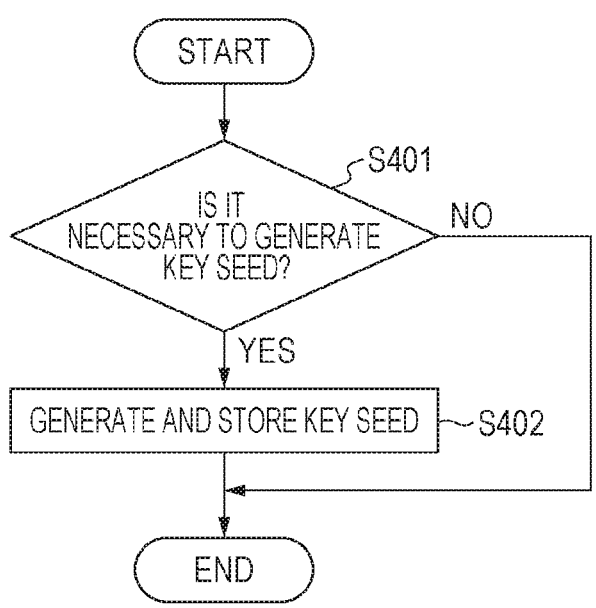
FIG. 4 illustrates a process for generating or reading a key seed described in the embodiment.
Figure 5:
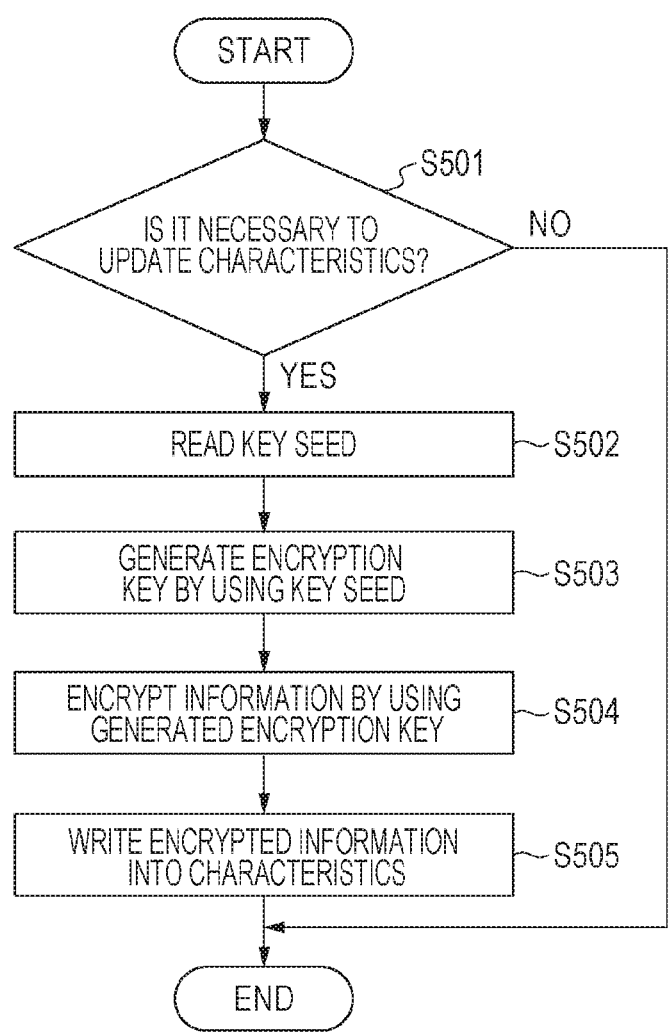
FIG. 5 illustrates a process for writing encrypted data into the short-range wireless communication unit.

Note that the timing for starting the process illustrated in FIG. 4, that is, the timing for determining whether the key seed is stored in S401, is the launch time of the communication apparatus 151 in this embodiment. However, the process illustrated in FIG. 4 may be started at other timing.

If it is determined in S401 that a valid key seed is not stored, it is determined that the key seed needs to be generated. Then, in S402, the communication apparatus 151 performs processing for generating the key seed. The key seed having the same value may be generated every time the key seed is generated, or the key seed having a random value may be generated. However, the generation is controlled so as not to generate the invalid value. In addition, in S402, the communication apparatus 151 stores the generated key seed in the non-volatile memory 161. Even if it is determined in S401 that the key seed is stored, the communication apparatus 151 generates the key seed in response to a user's instruction, if any, for regenerating the key seed.

Next, an example in which the communication apparatus 151 uses the key seed stored in the non-volatile memory 161 as illustrated in FIG. 4 will be described. Specifically, the communication apparatus 151 generates an encryption key from the key seed, and encrypts a setting value by using the encryption key, the setting value being stored in the RAM 153 or the non-volatile memory 161. Then, the communication apparatus 151 writes the encrypted setting value into the short-range wireless communication unit 157. Details of this process will be described with reference to the flowchart in FIG. 5 and FIG. 6.

FIG. 6 illustrates the structure of a database included in the short-range wireless communication unit 157 of the communication apparatus 151 as a GATT server in this embodiment. Through the process that will be described later with reference to FIG. 5, encrypted information is written into the database illustrated in FIG. 6. In FIG. 6, five characteristics are provided for a vendor's original service name "Original" (Service UUID: 00000000-0000-1000-1000-00405f9b34fb). For each characteristic, a read attribute or a write attribute, and whether data to be stored is to be encrypted or not is set. As for the characteristics whose "Read" is "Yes" and whose "Encryption" is "Yes" in FIG. 6, data is stored after being encrypted by using an encryption key. The encryption key is calculated from the value of the key seed provided in a key seed 603, which will be described later.

Next, part of content of the characteristics included in the short-range wireless communication unit 157 will be described in detail. For the characteristics of a service set identifier (SSID) 601 and a password 602, the SSID and the password that enable a direct connection of the communication unit 156 of the communication apparatus 151 as an access point are encrypted and are then stored. For the characteristic of a proper noun 604 in this embodiment, a character string "printer", which is a proper noun, is encrypted and is then stored. These pieces of encrypted information are treated as highly confidential information. The database included in the short-range wireless communication unit 157 as the GATT server illustrated in FIG. 6 is an example in this embodiment, and given items can be added thereto.

In S501, the communication apparatus 151 determines whether the time is a timing for updating the characteristics in the short-range wireless communication unit 157. The timing for updating the characteristics in the short-range wireless communication unit 157 is, for example, a case where setting values stored in the RAM 153 or the non-volatile memory 161 within the communication apparatus 151 are to be updated. In addition, the timing also includes a case where the characteristics in the short-range wireless communication unit 157 are to be initialized at the launch time of the communication apparatus 151, a case where the values of the characteristics are to be updated regardless of the setting values, and a case where the key seed is initialized.

If it is determined in S501 that the time is a timing for updating the characteristics, it is determined that the updating is necessary, and the process proceeds to S502. In S502, the communication apparatus 151 reads the key seed value stored in the RAM 153 or the non-volatile memory 161 in S402. In S503, the communication apparatus 151 generates an encryption key from the key seed read in S502. The encryption key is a value to be used when information is encrypted by using an encryption algorithm.

The encryption algorithm used in this embodiment is a shared key encryption method in which an encryption key used when information is encrypted is the same as a decryption key used for decryption. Although a type of shared key encryption method called Advanced Encryption Standard (AES) is employed as the encryption algorithm in this embodiment, the encryption algorithm is not limited to this, and other encryption algorithms may be employed.

In S504, by using the encryption key generated in S503, the communication apparatus 151 reads and encrypts the information (setting values of the communication apparatus 151) stored in the RAM 153 or the non-volatile memory 161. In this embodiment, the setting values to be read from the RAM 153 or the non-volatile memory 161 are the SSID and the password used by the information processing apparatus 101 to directly communicate with the communication unit 156 of the communication apparatus 151. However, the information to be read and encrypted is not limited to these.

In S505, the information (setting values) encrypted in S504 is written into the characteristics in the short-range wireless communication unit 157. In addition, values that do not have to be encrypted may be read from the RAM 153 or the non-volatile memory 161 at this timing to be written into the characteristics in the short-range wireless communication unit 157 without encryption. If a network setting value is updated in this embodiment, the SSID 601 and the password 602 are encrypted in S504 and are then written into the characteristics. It is needless to say that the information is not limited to this combination, and any value may be written into the characteristics after being encrypted or not being encrypted.

If it is determined in S501 that the key seed is initialized, an encryption key is generated from the initialized key seed in S502 and S503. Subsequently, from the RAM 153 or the non-volatile memory 161, the communication apparatus 151 reads all the values to be stored in the characteristics in which "Read" is "Yes" and "Encryption" is "Yes" in FIG. 6. Then, the communication apparatus 151 encrypts the read values in S504 and writes the encrypted values into characteristics in S505.

Next, the process in which the communication apparatus 151 sets the key seed in a public state will be described. As will be described later with reference to FIG. 8, in this embodiment, by setting the key seed in the public state and by transmitting/receiving encrypted information, pairing (process for registering the communication partner) for GATT communication in BLE is performed. Accordingly, the process for setting the key seed in the public state in the communication apparatus 151 will be described with reference to the flowchart in FIG. 7.

Note that in this embodiment, the communication apparatus 151 transitions to a key seed public state in response to a user's specific key operation through the input interface 158. This key operation causes the state of the communication apparatus 151 to transition to the key seed public state. In this embodiment, a non-key seed public state means a state where the value of the key seed is an invalid value whereas the key seed public state means a state where the value of the key seed is a valid value.

In response to the user's specific key operation, S701 is performed. In S701, the communication apparatus 151 writes the value of the key seed generated in S402 into the key seed 603, which is a predetermined GATT characteristic in which the value of the key seed is stored in the database illustrated in FIG. 6. The information processing apparatus 101 can refer to the key seed 603 via the BLE communication.

In S702 and S704, the communication apparatus 151 determines whether a predetermined end condition of the key seed public state is satisfied. The key seed public state is continued until the end condition is satisfied. The end condition in S702 is, for example, a notification from the information processing apparatus 101, indicating that the communication apparatus 151 has been registered, via the GATT communication with the information processing apparatus 101. For example, the notification is a completion notification that will be described later in S810 in FIG. 8. Upon reception of this notification, it is determined in S702 that the end condition is satisfied. On the other hand, the end condition used in the determination in S704 is timeout. That is, if a predetermined time has elapsed (timeout occurs) from the writing of the key seed in S701, it is determined in S704 that the end condition is satisfied. That is, if it is determined in S702 that the notification indicating that the communication apparatus 151 has been registered is received from the information processing apparatus 101, or if it is determined in S704 that the timeout occurs, it is determined that the end condition of the key seed public state is satisfied. S702 and S704 are repeated until the end condition is satisfied. Note that the timeout time for determination in S704 if the key seed is set in the public state in S701 in accordance with the user operation is set to a shorter time than the timeout time in a case where the key seed is set in the public state at the time of initial setting, which will be described later in detail with reference to FIG. 11.

If it is determined in S702 or S704 that the end condition is satisfied, in S703, the communication apparatus 151 overwrites the value of the key seed indicated by the key seed 603 to the invalid value. In response to S703, the state of the communication apparatus 151 transitions to the non-key seed public state, and the process illustrated in FIG. 7 ends.

Note that the transition to the non-key seed public state in S703 can also be realized by setting the characteristic in which the key seed is stored in the GATT database illustrated in FIG. 6 to an unreadable state. Also in this case, the effects of the embodiment can be obtained. Through the above control, a person other than an authenticated user who can perform the specific operation on the apparatus is not allowed to read the key seed.

Figure 8:
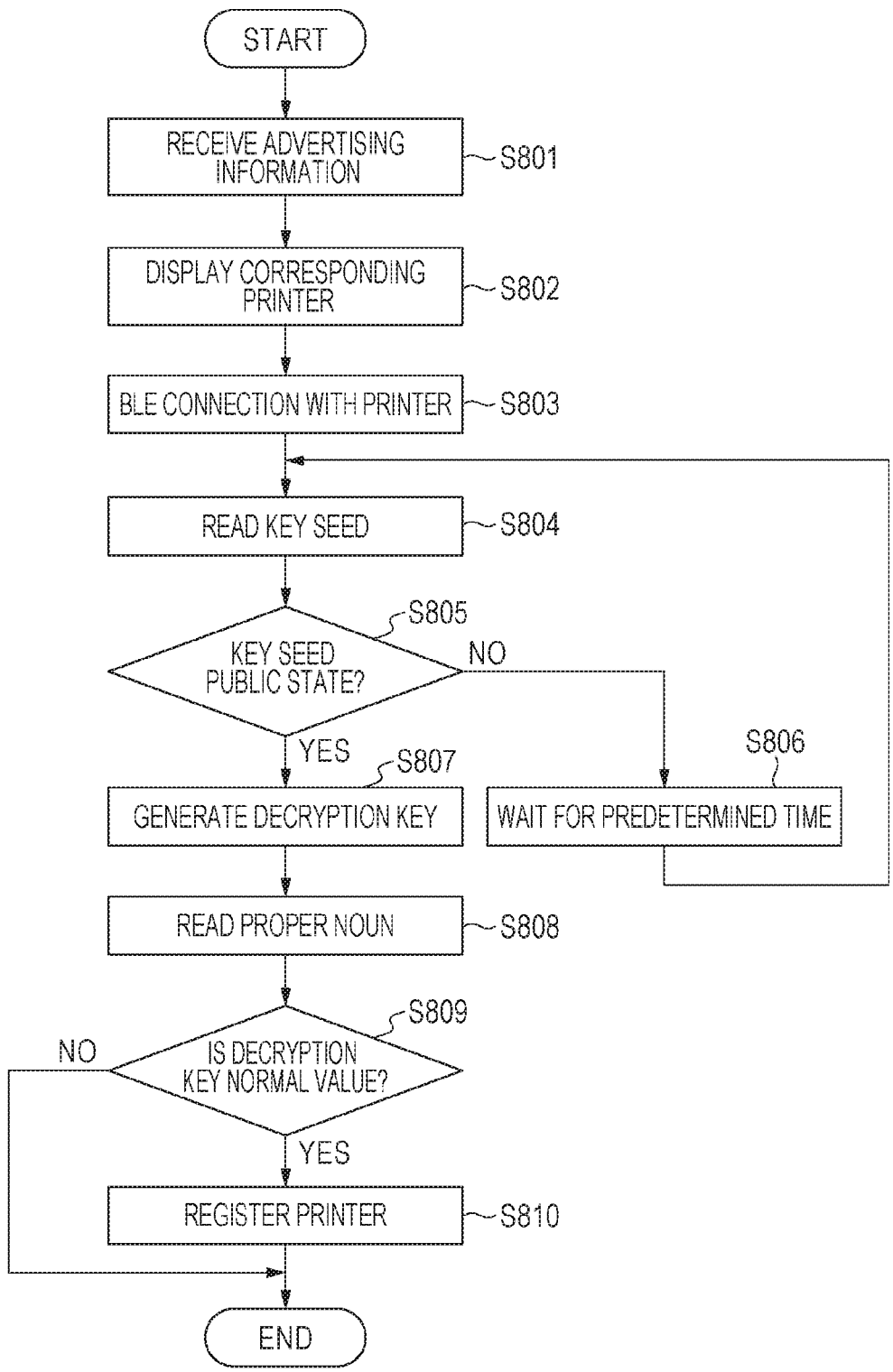
FIG. 8 illustrates a process for registering a printer in the information processing apparatus.

Next, a pairing process (process for registering the communication partner) performed by the information processing apparatus 101 will be described. A process for registering a printer as the communication apparatus 151 in an application of the information processing apparatus 101 will be described with reference to the flowchart in FIG. 8. Note that the printer registration process illustrated in FIG. 8 is started when a user's instruction is input through the input interface 102 with respect to a specific key displayed on the display unit 108 by the application. In addition, the process illustrated in FIG. 8 is realized by the application being executed in the information processing apparatus 101.

Upon start of the printer registration process in the application, in S801, the short-range wireless communication unit 110 receives advertising information by BLE advertise and a scan response from peripheral printers.

Subsequently, in S802, on the basis of the advertising information received in S801, the information processing apparatus 101 checks a printer that conforms to the application and that is not registered yet. Then, printer information indicating that the printer can be newly registered is displayed on the display unit 108. Note that if a plurality of printers that can be newly registered are found on the basis of the advertising information in S802, a plurality of pieces of printer information corresponding to the plurality of printers are displayed, and a user is allowed to select a printer to be registered (not illustrated).

Subsequently, in S803, the information processing apparatus 101 requests a connection to the printer that corresponds to the printer information selected by the user through the short-range wireless communication unit 110 and establishes a BLE connection. Note that the GATT communication, in which it is necessary that pairing has been performed, is not performed at this stage. Upon establishment of the BLE connection, in S804, the information processing apparatus 101 reads the value of a predetermined characteristic stored in the key seed 603 of the communication apparatus 151.

Subsequently, in S805, the information processing apparatus 101 determines whether the communication apparatus 151 is in the key seed public state. Specifically, in S805, if the value of the key seed 603 read in S804 is the invalid value or is unreadable, the information processing apparatus 101 determines that the communication apparatus 151 is in the non-key seed public state.

If it is determined in S805 that the communication apparatus 151 is in the non-key seed public state, the process proceeds to S806. In S806, the information processing apparatus 101 waits for a predetermined time. Note that in S806, the information processing apparatus 101 may display, on the display unit 108 of the information processing apparatus 101 for example, information for prompting the user to set the communication apparatus 151 in the key seed public state.

After waiting for the predetermined time in S806, the information processing apparatus 101 repeats S804 and S805 and waits for setting of the communication apparatus 151 in the key seed public state. If the communication apparatus 151 is not set in the key seed public state although the waiting in S806 has repeated a predetermined number of times or a predetermined time that is longer than the waiting time in S806 has elapsed, the process illustrated in FIG. 8 ends (not illustrated). Alternatively, if, for example, a cancel instruction is received from the user, the process illustrated in FIG. 8 ends (not illustrated).

If it is determined in S805 that the communication apparatus 151 is in the key seed public state, in S807, the information processing apparatus 101 generates a decryption key from the key seed 603 read in S804.

In the GATT database of the communication apparatus 151 illustrated in FIG. 6, a proper noun character string "printer" is encrypted and stored in the characteristic of the proper noun 604 and is readable. In S808, via the GATT communication in which pairing is unnecessary, the information processing apparatus 101 reads the encrypted proper noun 604 and decrypts it by using the decryption key generated in S807.

Note that the application for executing the process illustrated in FIG. 8 stores in advance the structure regarding the characteristics illustrated in FIG. 6, the unique value of the proper noun 604 after decryption, and a value to be written into a completion notification 605 regardless of the communication with the communication apparatus 151. For example, the above information is stored in the information processing apparatus 101 when the program of the application is installed in the information processing apparatus 101. The above structure regarding the characteristics, the unique value of the proper noun 604 after decryption, and the value to be written into the completion notification 605 are provided by the vendor of the printer that is the communication apparatus 151. Thus, for example, if the same vendor provides the communication apparatus 151 and the application, these structure and values are determined by the same vendor.

In S809, the information processing apparatus 101 compares the proper noun information that is decrypted in S808 with the proper noun information "printer" that is stored in advance in the information processing apparatus 101, and if the two pieces of information correspond with each other, it is determined that the decryption key is a normal value.

If it is determined in S809 that the decryption key is a normal value, in S810, the information processing apparatus 101 performs the registration process by storing the identifier, such as BD_ADDR, of the printer selected in S802 in association with the key seed. Further, with respect to the characteristic of the completion notification 605, a specific character string "registered" indicating the completion of registration is encrypted by the above shared key method, the encrypted value is written by using the GATT communication, and the process illustrated in FIG. 8 ends. On the other hand, if it is determined in S809 that the decryption key is not a normal value, the information processing apparatus 101 does not register the printer, and the process illustrated in FIG. 8 ends.

The communication apparatus 151 decrypts the value that is written as the completion notification 605 by the information processing apparatus 101 in S810. Then, if the decrypted value is a predetermined value, it is confirmed that the writing of this value as the completion notification 605 is writing after encryption by using the key seed designated in FIG. 4. By this confirmation, it can also be confirmed in the communication apparatus 151 that the registration process has normally been completed in the information processing apparatus 101.

Figure 9:
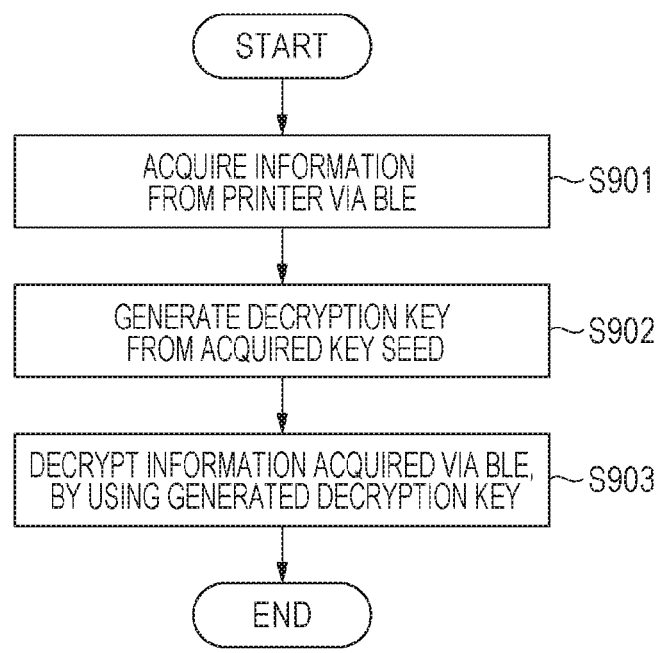
FIG. 9 illustrates acquisition of information via Bluetooth Low Energy (BLE) in the information processing apparatus.

Next, with reference to the flowchart in FIG. 9, a process in which information is acquired via BLE from the printer as the communication apparatus 151 in the application of the information processing apparatus 101 will be described in detail. In this example, it is assumed that the process illustrated in FIG. 8 has been performed, and the printer has been registered in the information processing apparatus 101. That is, the BLE connection between the information processing apparatus 101 and the communication apparatus 151 has been established as in S803, and also the communication apparatus 151 has been registered in the application of the information processing apparatus 101 in S810. In addition, the process illustrated in FIG. 9 is also realized by the information processing apparatus 101 executing the application that has been used for executing the process illustrated in FIG. 8.

In S901, the information processing apparatus 101 transmits a request for acquiring information to the printer as the communication apparatus 151 through the short-range wireless communication unit 110. The information that is requested to be acquired herein is, out of the information illustrated in FIG. 6, information for which "Encryption" is "Yes", such as the SSID and the password, and is encrypted by the communication apparatus 151 in S504. Note that, on the condition that the communication apparatus 151 has been registered in the information processing apparatus 101 in S810, the application of the information processing apparatus 101 transmits the request for acquiring the SSID and the password, for example. That is, information that is not allowed to be acquired before S810 becomes allowed to be acquired through this processing.

In S902, from the key seed acquired from the communication apparatus 151 in S804, the information processing apparatus 101 generates a decryption key for decrypting encrypted information. The processing for generating the decryption key is the same or substantially the same as that in S503 or S807. Note that since this embodiment employs the shared key encryption method, the process for calculating the decryption key is the same or substantially the same as the process for calculating the encryption key. However, in a case where another encryption method is employed, the process for calculating the decryption key is not necessarily the same or substantially the same as the process for calculating the encryption key.

In S903, by using the decryption key generated in S902, the information processing apparatus 101 decrypts the information acquired in S901. Through this decryption process, the application of the information processing apparatus 101 can acquire the encrypted information from the printer as the communication apparatus 151 and can use the acquired information of the communication apparatus 151.

According to the above embodiment, as illustrated in FIG. 8, when pairing (process for registering the communication partner) for BLE is performed, the pairing can be performed by transferring encrypted information. In addition, according to the embodiment, pairing is automatically performed in response to a user's depression of a key on the information processing apparatus 101 (e.g., a smartphone) and the communication apparatus 151 (e.g., a printer). Thus, for example, as compared with a pairing method in which the user inputs, to the information processing apparatus 101, a PIN code displayed on the communication apparatus 151, pairing can be performed easily. That is, according to the process in this embodiment, pairing can be performed easily via a secure communication.

Furthermore, according to this embodiment, as in the secure communication in which encryption and decryption are performed after pairing as illustrated in FIG. 9, pairing is performed by encrypting information, transmitting and receiving the information, and decrypting the information by the information processing apparatus 101 and the communication apparatus 151. Thus, pairing can be realized through a process that is the same or substantially the same as the secure communication after pairing without a special process that is different from the communication after pairing, such as the above method of displaying and inputting the PIN code.

Figure 7:
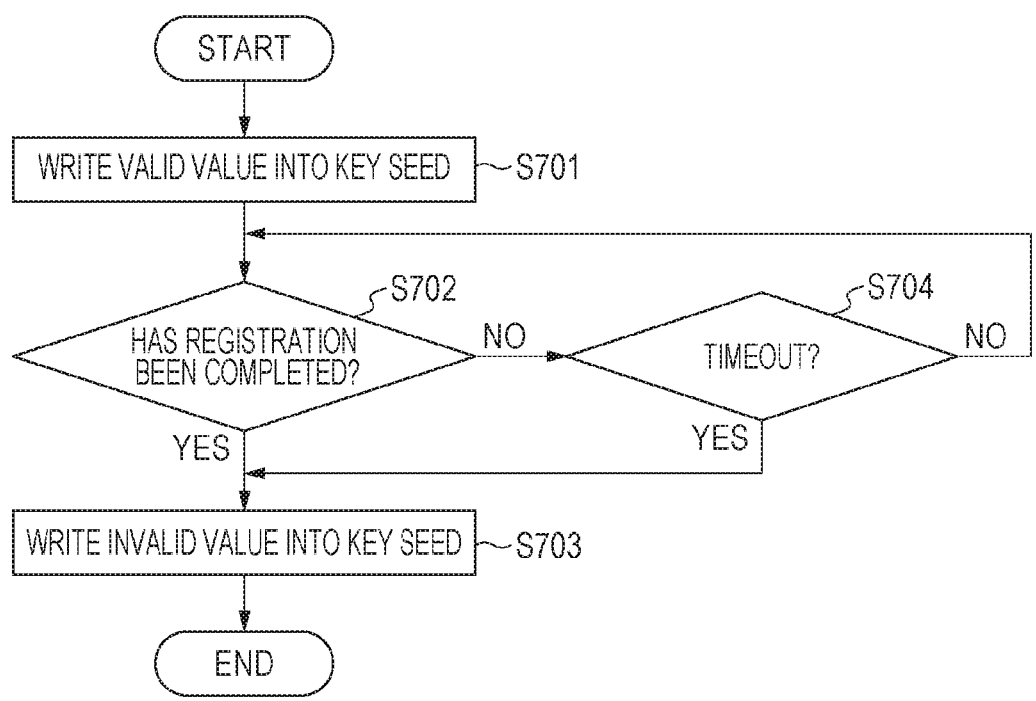
FIG. 7 illustrates transition of a key seed public state of the communication apparatus.

Next, operations of the communication apparatus 151 at the time of initial setting will be described. In this embodiment, an event for setting the communication apparatus 151 in the key seed public state is, as illustrated in FIG. 7, a user operation (e.g., depression of a specific key provided in the communication apparatus 151). In addition, in this embodiment, another event for setting the communication apparatus 151 in the key seed public state is initial setting at the time of turning on the communication apparatus 151. The initial setting is set when the power of the communication apparatus 151 (e.g., a printer) is turned on for the first time. The initial setting includes a network setting for connecting the communication apparatus 151 to an apparatus such as a PC or a smartphone (e.g., the information processing apparatus 101) via a wireless LAN or the like. For this network setting, by using the key seed that is set in the public state in the initial setting, the information processing apparatus 101 automatically performs pairing with the communication apparatus 151 via BLE through the process illustrated in FIG. 8. Upon completion of pairing, information for the network setting (e.g., wireless LAN setting) is transferred via the GATT communication between the information processing apparatus 101 and the communication apparatus 151, and through this communication, the information processing apparatus 101 and the communication apparatus 151 are automatically connected via the wireless LAN or the like.

The network setting in this embodiment may be various network settings. For example, the SSID 601 and the password 602 of an access point when the communication apparatus 151 operates as the access point may be received by the information processing apparatus 101 via the GATT communication after pairing. Then, through connection to the access point by using the SSID 601 and the password 602 that have been received by the information processing apparatus 101, the information processing apparatus 101 and the communication apparatus 151 may be directly connected via the wireless LAN. As another method for the network setting, for example, the SSID and the password of an external access point (e.g., the access point 131) to which the information processing apparatus 101 is connected may be transmitted from the information processing apparatus 101 to the communication apparatus 151 via the GATT communication after pairing. Then, the communication apparatus 151 may be automatically connected to the access point by using the SSID and the password that have been received, so that the information processing apparatus 101 and the communication apparatus 151 are connected to the common access point. Thus, the information processing apparatus 101 and the communication apparatus 151 may be automatically connected via the wireless LAN. In this case, the communication apparatus 151 may search for the access point, and as a result of the search, the information processing apparatus 101 may be notified of a plurality of SSIDs via the GATT communication. Then, from among the received plurality of SSIDs, the information processing apparatus 101 may transmit the SSID of an access point to which the information processing apparatus 101 is connected, to the communication apparatus 151 via the GATT communication. Thus, the communication apparatus 151 and the information processing apparatus 101 can surely be connected via the access point to which both the apparatuses can be connected.

Next, a process performed by the communication apparatus 151 at the time of initial setting will be described in detail with reference to FIG. 10. At the time of initial setting of the communication apparatus 151, highly confidential information that cannot leak, such as personal information and use history, is not held in the GATT database. As the user uses the apparatus, such highly confidential information is accumulated in the apparatus, and as described in S505, the information is encrypted and stored in the GATT database so as to be readable from an external apparatus that holds a shared encryption key. The time of initial setting herein is, for example, a case where the apparatus is used for the first time after purchase or a case where all the highly confidential information is deleted. The non-volatile memory 161 of the communication apparatus 151 stores an initial setting flag indicating whether the setting state is an initial setting state, and particularly stores the flag that is set when the communication apparatus 151 is sold or when all the highly confidential information is deleted.

Figure 10:
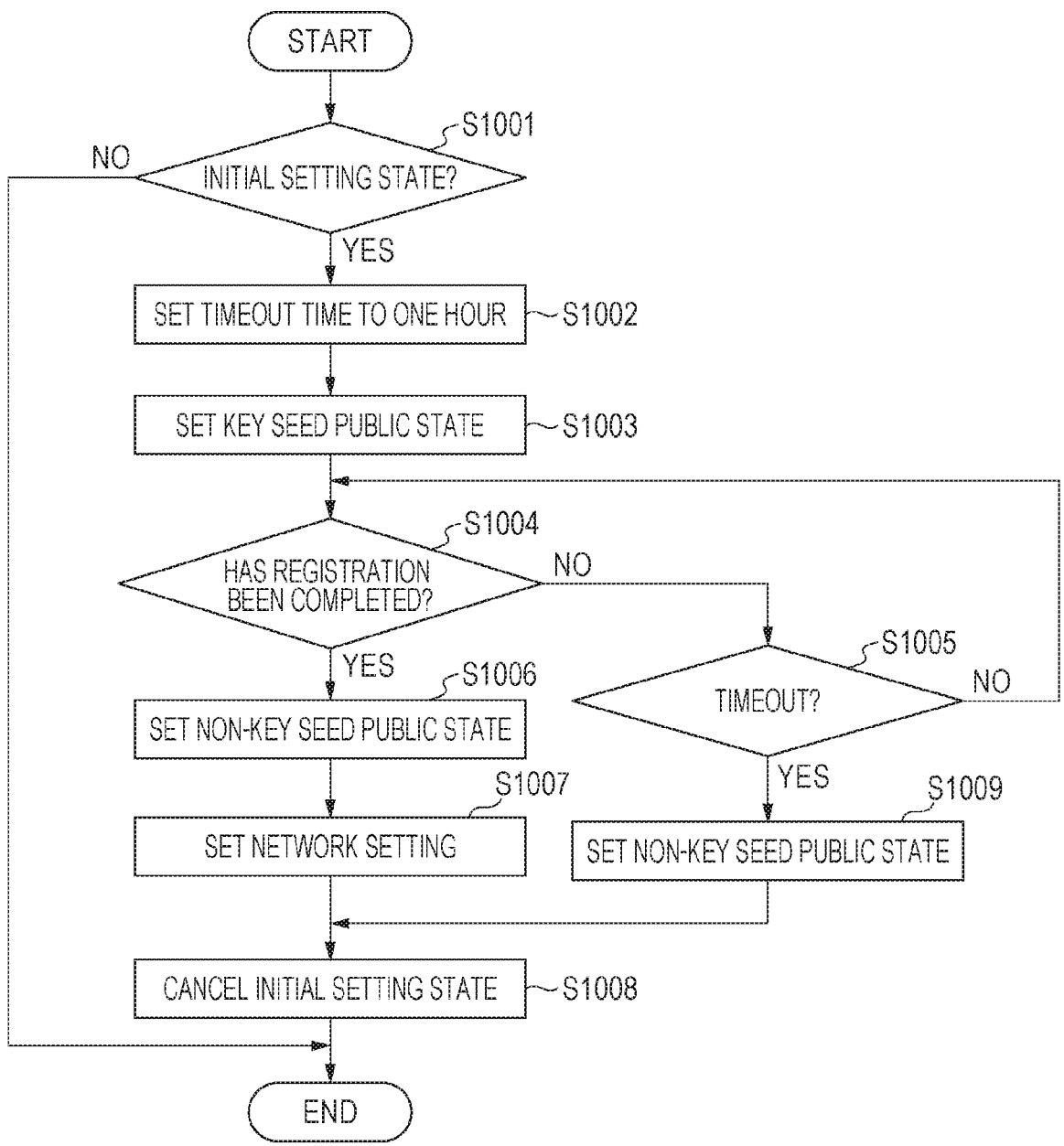
FIG. 10 illustrates a process performed by the communication apparatus at the time of initial setting.

The flowchart in FIG. 10 illustrates a process performed when the power of the communication apparatus 151 is turned on, that is, the communication apparatus 151 is started. In S1001, the communication apparatus 151 checks the initial setting flag stored in the non-volatile memory 161 to determine whether the setting state is the initial setting state. If it is determined that the setting state is not the initial setting state, the process illustrated in FIG. 10 ends.

If it is determined that the setting state is the initial setting state, in S1002, the communication apparatus 151 sets the timeout time to one hour. The timeout time will be described later. In S1003, as in S701, the communication apparatus 151 writes a valid value to the key seed 603 to transition to the key seed public state. During the timeout time, the key seed public state is continued.

In S1004 and S1005, determination processing that is the same or substantially the same as that of the end condition of the key seed public state in S702 and S704 in FIG. 7 described above is performed. In S1004, the communication apparatus 151 determines whether the printer registration process has ended and the completion notification described in S810 in FIG. 8 has been received. If the registration completion notification has not been received, in S1005, the communication apparatus 151 determines whether the elapsed time from when the key seed public state is set in S1003 exceeds the timeout time. S1004 and S1005 are repeated until the end condition is satisfied.

If the registration completion notification has been received in S1004, in S1006, the communication apparatus 151 transitions to the non-key seed public state as in S703 in FIG. 7. Subsequently, in S1007, the communication apparatus 151 receives encrypted information for network setting via the GATT communication from the information processing apparatus 101 in which the encryption key has been generated. The information for network setting is, for example, as described above, the SSID, the password, or the like of the access point 131 to which the information processing apparatus 101 is connected. The communication apparatus 151 decrypts and uses the received information so as to establish the network connection with the information processing apparatus 101 via the access point 131.

On the other hand, if it is determined in S1005 that the timeout time has ended without the registration completion notification in S1004, in S1009, the communication apparatus 151 transitions to the non-key seed public state as in S703 and S1006.

If the network setting has been completed in S1007, or if the communication apparatus 151 transitions to the non-key seed public state in S1009, in S1008, the communication apparatus 151 turns off the initial setting flag and cancels the initial setting state, and the process illustrated in FIG. 10 ends. If the initial setting includes a setting item other than the network setting, and if the setting of that setting item is not completed, the setting item may be set in S1008.

Through the process illustrated in FIG. 10, in the initial setting state of the communication apparatus 151, the user gives an instruction for turning on the communication apparatus 151, and then, by operating the information processing apparatus 101 without operating the communication apparatus 151, the user can cause the communication apparatus 151 to perform the network setting.

FIG. 11 illustrates the timeout time for maintaining the key seed public state. As illustrated in FIG. 7, if the communication apparatus 151 transitions to the key seed public state in response to a user's specific key operation, in S704, 10 seconds may be set as the timeout time for determining that the key seed public state ends. The timing at which the specific key operation occurs is, as described in S805 in FIG. 8, assumed to be a case where the information processing apparatus 101 displays information for prompting the user to cause the communication apparatus 151 to transition to the key seed public state. That is, it is assumed that the user sees the displayed information on the information processing apparatus 101 and then performs the above specific key operation in the communication apparatus 151. For example, if the communication apparatus 151 is already connected via BLE with the information processing apparatus 101 and is to be newly connected via BLE with another information processing apparatus 101, the above specific key operation is performed.

On the other hand, if the power of the communication apparatus 151 is turned on in the initial setting state as described above with reference to FIG. 10, in S1005, the timeout time of the key seed public state may be set to one hour. For example, in the initial setting process in the printer as the communication apparatus 151, at the same time as the network setting process in S1007, a maintenance process such as filling an ink tank or setting a print medium is performed. Thus, the timeout time for determination in S1005 is set to a comparatively long time. That is, even if it takes time for the process regarding the ink tank or the print medium, the network setting process of the communication apparatus 151 can be performed through the information processing apparatus 101. In this manner, in this embodiment, a comparatively longer time is set for the time of initial setting than for the time of user operation. Specific timeout times are not limited to the ones illustrated in FIG. 11.

The timeout time as a time limit is provided for the key seed public state in the above manner. Accordingly, it is possible to prevent an unnecessary key seed public state, thereby increasing the security level. In addition, by changing the timeout time of the key seed public state depending on the use condition of the communication apparatus 151, it is possible to provide a highly secure and highly convenient apparatus. For example, with the user's specific key operation described in FIG. 7, the user is notified of the key operation and explicitly gives an instruction for BLE pairing. Thus, a comparatively short time is sufficient as the timeout time of the key seed public state, and the security level is secured with this short time. On the other hand, as for the initial setting described in FIG. 10, in accordance with the initial turning on of the power of the communication apparatus 151, the key seed is automatically set in the public state. Furthermore, it is necessary for the user to perform a setting operation for the ink tank or the print medium, for example. Thus, a comparatively long time is set as the timeout time of the key seed public state, thereby securing the user's opportunity for BLE pairing.

Note that in S703 in FIG. 7 and S1006 and S1009 in FIG. 10 in this embodiment, the communication apparatus 151 writes the invalid value to the key seed as the control for setting a private state of the key seed that is stored in the communication apparatus 151. However, the control regarding the key seed stored in the communication apparatus 151 for preventing the registration process from being performed by the information processing apparatus 101 is not limited to this. For example, control may be performed such that the key seed is deleted or accesses to a storage area of the key seed are prohibited. Also with such control, the information processing apparatus 101 can no longer generate a decryption key from the key seed or perform decryption by using the decryption key. Thus, a condition for performing the registration process in the information processing apparatus 101 is no longer satisfied, preventing the registration process from being performed.

Note also that this embodiment has described the use of the BLE communication by which the information processing apparatus 101 acquires the encrypted information from the communication apparatus 151. However, the communication scheme by which the information processing apparatus 101 acquires the encrypted information from the communication apparatus 151 may be a short-range wireless communication other than BLE, such as near-field communication (NFC). In that case, the effects of the embodiment can also be obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2018-143281, filed Jul. 31, 2018, which is hereby incorporated by reference herein in its entirety.

What is claimed is:

1. An information processing method in an information processing system including a communication apparatus and an information processing apparatus, the communication apparatus including a first communication unit that performs communication via a predetermined wireless communication, the information processing apparatus including a second communication unit that performs communication via the predetermined wireless communication, the information processing method comprising:

writing, by the communication apparatus, key information to be used for generating a decryption key, into a storage area that the information processing apparatus is capable of referring to by using the second communication unit;

reading, by the information processing apparatus using the second communication unit, the key information that has been written into the storage area;

performing, by the information processing apparatus, a registration process for registering the communication apparatus if the decryption key is generated and if first information, which is read from the communication apparatus and is decrypted on the basis of the generated decryption key, corresponds with second information, which is stored in advance in the information processing apparatus; and performing, by the communication apparatus, control regarding the key information stored in the storage area such that the key information becomes invalid, if an elapsed time from when the key information is written into the storage area in the writing exceeds a predetermined time, wherein the communication apparatus is configured to write the key information into the storage area if a first event or a second event occurs, and wherein the predetermined time differs between a case where the key information is written in response to occurrence of the first event and a case where the key information is written in response to occurrence of the second event.

2. The information processing method according to claim 1, wherein the first event is a predetermined user operation in the communication apparatus.

3. The information processing method according to claim 2, wherein the method further comprises displaying, by the information processing apparatus, information that prompts a user to perform the predetermined user operation in the communication apparatus.

4. The information processing method according to claim 3, wherein the second event is a user operation in the communication apparatus, the user operation being different from the predetermined user operation, performed without the information being displayed, and wherein the predetermined time is either a first time or a second time, and the second time that is set if the key information is written in response to occurrence of the second event is longer than the first time that is set if the key information is written in response to occurrence of the first event.

5. The information processing method according to claim 4,
wherein the second event is an operation for turning on a power of the communication apparatus that is in an initial setting state, and
wherein the key information is not written into the storage area even if the operation for turning on the power of the communication apparatus is performed while the communication apparatus is not in an initial setting state.

6. The information processing method according to claim 5,
wherein a predetermined flag is set in the communication apparatus in the initial setting state,
wherein the key information is written into the storage area on condition that the predetermined flag is set when the power of the communication apparatus is turned on, and
wherein the predetermined flag becomes invalid in a case where the registration process is performed or the key information becomes invalid.

7. The information processing method according to claim 1, wherein the control is performed in response to receipt of a predetermined notification from the information processing apparatus after the registration process even if the elapsed time does not exceed the predetermined time.

8. The information processing method according to claim 1,
wherein the writing step further comprises writing, by the communication apparatus into the storage area, the first information that is encrypted by using an encryption key corresponding with the decryption key,
wherein the reading step further comprises reading, by the information processing apparatus using the second communication unit, the first information that has been written into the storage area,
wherein, regardless of communication with the communication apparatus, the second information is stored in the information processing apparatus in advance, and
wherein the registration process is performed if the decryption key is generated from the key information, if the first information is decrypted by using the generated decryption key, and if the decrypted first information corresponds with the second information.

9. The information processing method according to claim 8, wherein the writing step further comprises generating, by the communication apparatus, the encryption key from the key information, encrypting the first information by using the generated encryption key, and writing the encrypted first information into the storage area.

10. The information processing method according to claim 1, further comprising:
acquiring, by the information processing apparatus from the first communication unit, information that is not allowed to be acquired before the performing of the registration process, on condition that the registration process has been performed.

11. The information processing method according to claim 10, further comprising the step of decrypting, by the information processing apparatus, the acquired information, using the generated decryption key.

12. The information processing method according to claim 1, wherein the predetermined wireless communication is Bluetooth Low Energy (BLE).

13. The information processing method according to claim 1, wherein the communication apparatus is a printer.

14. An information processing system including a communication apparatus and an information processing apparatus, the communication apparatus including a first communication unit that performs communication via a predetermined wireless communication, the information processing apparatus including a second communication unit that performs communication via the predetermined wireless communication, the information processing system comprising:
in the communication apparatus,
at least one hardware processor that, upon execution of instructions stored in a memory, is configured to operate as:
a writing unit configured to write key information to be used for generating a decryption key, into a storage area that the information processing apparatus is capable of referring to by using the second communication unit;
in the information processing apparatus,
at least one hardware processor that, upon execution of instructions stored in a memory, is configured to operate as:
a reading unit configured to read, by using the second communication unit, the key information that has been written into the storage area; and
a registration unit configured to perform a registration process for registering the communication apparatus if the decryption key is generated and if first information, which is read from the communication apparatus and is decrypted on the basis of the generated decryption key, corresponding with second corresponds information, which is stored in advance in the information processing apparatus,
wherein the at least one processor in the communication apparatus further controls a control unit configured to perform control regarding the key information stored in the storage area such that the key information becomes invalid if an elapsed time from when the key information is written into the storage area by the writing unit exceeds a predetermined time,
wherein the writing unit is configured to write the key information into the storage area if a first event or a second event occurs, and
wherein the predetermined time differs between a case where the key information is written in response to occurrence of the first event and a case where the key information is written in response to occurrence of the second event.

15. A communication apparatus that performs communication via a predetermined wireless communication with an information processing apparatus, the communication apparatus comprising:
at least one hardware processor that, upon execution of instructions stored in a memory, is configured to operate as:
a writing unit configured to write key information to be used for generating a decryption key into a storage area that the information processing apparatus is capable of referring to via the predetermined wireless communication; and
a control unit configured to perform control regarding the key information stored in the storage area such that the key information becomes invalid if an elapsed time from when the key information is written into the storage area by the writing unit exceeds a predetermined time, wherein the writing unit writes the key information into the storage area if a first event or a second event occurs, and wherein the predetermined time differs between a case where the key information is written in response to occurrence of the first event and a case where the key information is written in response to occurrence of the second event.

16. The communication apparatus according to claim 15, wherein the first event is a predetermined user operation in the communication apparatus.

17. The communication apparatus according to claim 16, wherein information that prompts a user to perform the predetermined user operation in the communication apparatus is displayed by the information processing apparatus, wherein the second event is a user operation in the communication apparatus, the user operation being different from the predetermined user operation, performed without the information being displayed, and wherein the predetermined time is either a first time or a second time, and the second time that is set if the key information is written in response to occurrence of the second event is longer than the first time that is set if the key information is written in response to occurrence of the first event.

18. The communication apparatus according to claim 17, wherein the second event is an operation for turning on a power of the communication apparatus that is in an initial setting state, and wherein the key information is not written into the storage area even if the operation for turning on the power of the communication apparatus is performed while the communication apparatus is not in an initial setting state.

19. The communication apparatus according to claim 15, wherein the predetermined wireless communication is Bluetooth Low Energy (BLE).

20. The communication apparatus according to claim 15, wherein the communication apparatus is a printer.

* * * * *